United States Patent Office 2,701,313
Patented Feb. 1, 1955

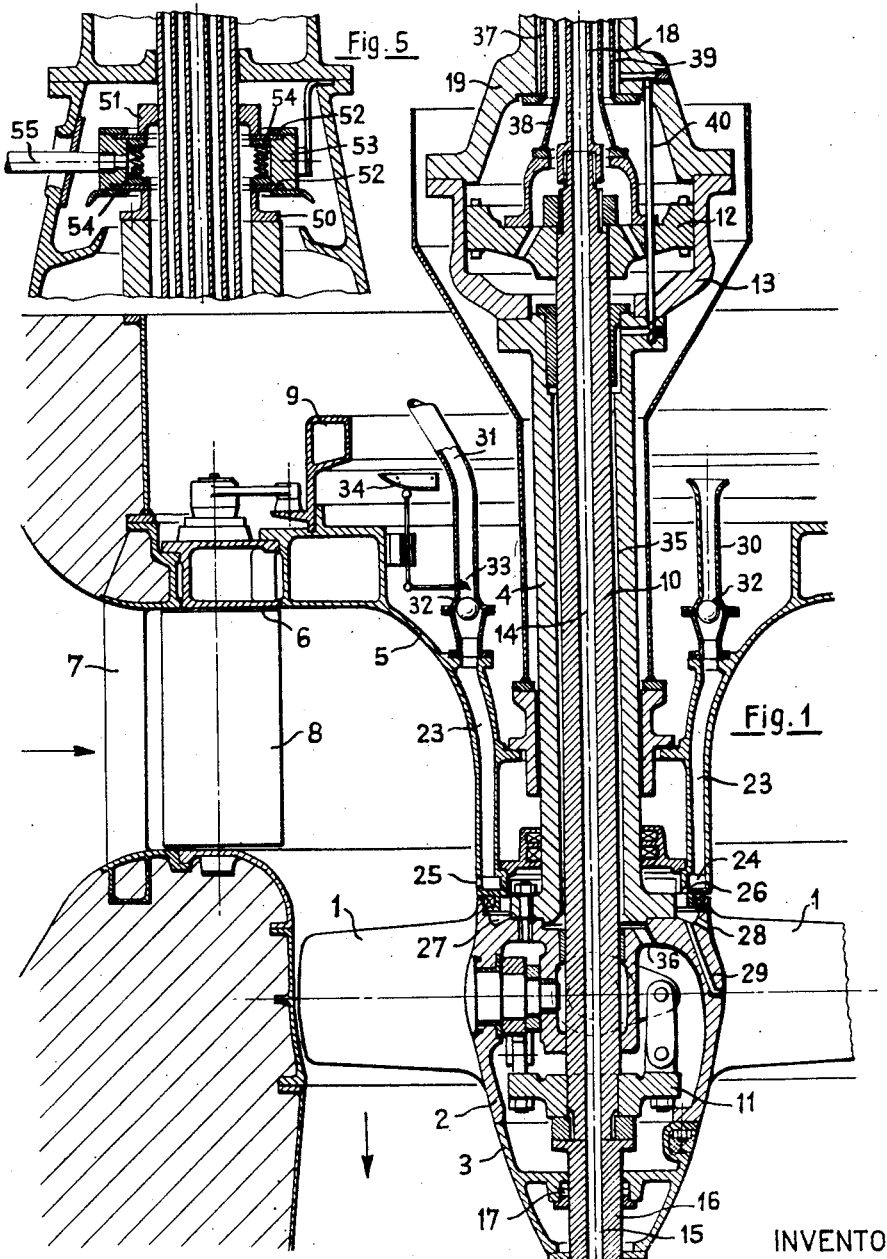

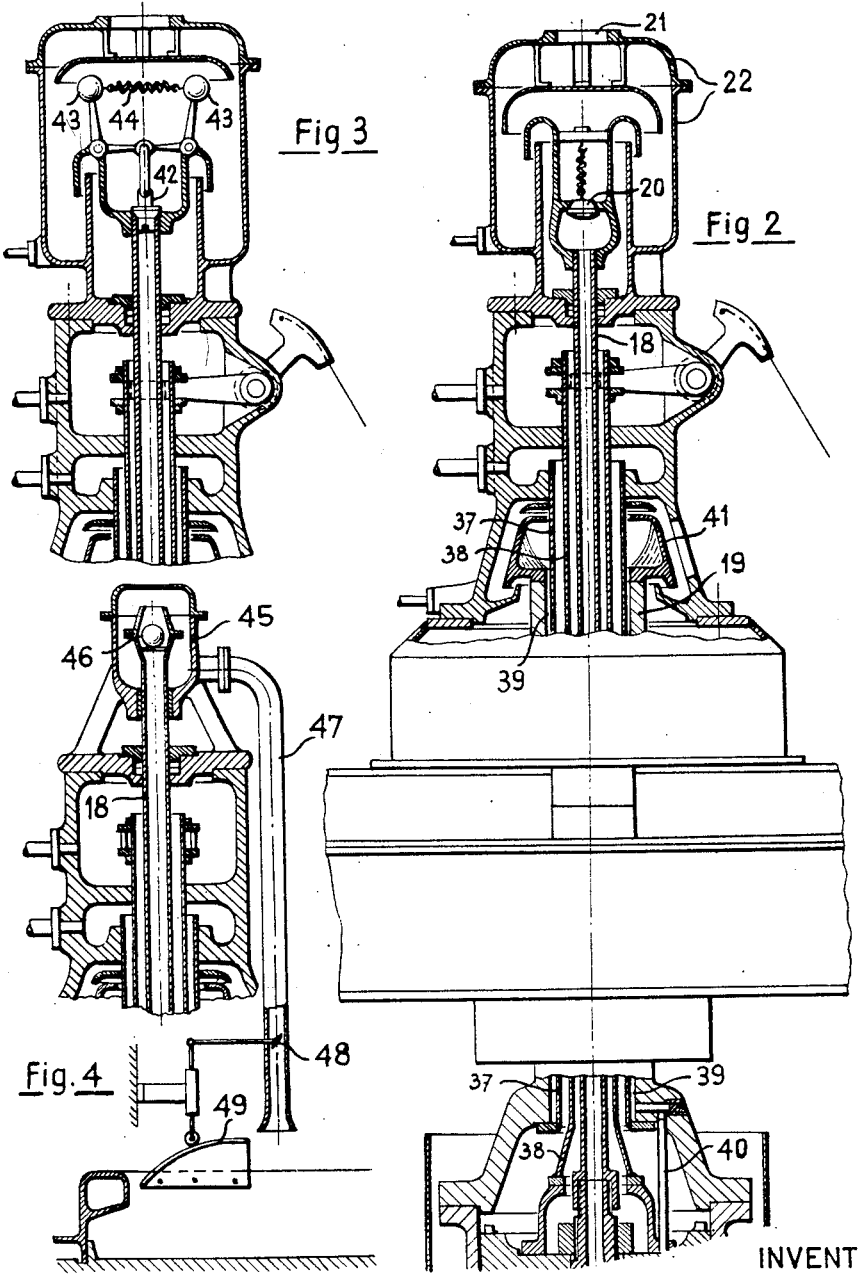

2,701,313

AIR SUPPLY TO TURBINE RUNNERS OF HYDROELECTRIC POWER PLANTS

Heinrich Albert Obrist, Zurich, Switzerland, assignor to Escher Wyss Aktiengesellschaft, Zurich, Switzerland, a corporation of Switzerland Application February 18, 1954, Serial No. 411,239

Claims priority, application Switzerland March 13, 1953

12 Claims. (Cl. 290—52)

The invention relates to a hydro-electric installation consisting of a propeller type turbine with adjustable runner vanes and a generator.

In the operation of such turbines with part-load or overload or at overspeed, pressures below atmospheric pressure may be set up in the region of the runner, which may lead to cavitation phenomena and unstable flow conditions, and which may cause noises and vibration. Such phenomena may be reduced or entirely avoided by the supply of air to the points at which the said negative pressures occur.

The object of the invention is to supply air to the runner of such a turbine in a simple manner adapted to the particular operating conditions of the propeller type turbines with adjustable runner vanes. In accordance with the invention, for this purpose, in a hydro-electric power plant consisting of a propeller type turbine with adjustable runner vanes and a generator the adjusting rod serving to adjust the runner vanes has formed therein a central bore which communicates with the outlet side of the runner and serves for the admission of air to the said outlet side.

The air may be supplied to this central bore in any desired manner. Preferably, however, there is connected to that end of the adjusting rod which is opposite to the turbine runner a tube communicating with the central bore thereof and serving to supply the air, which tube extends throughout the shaft of the generator. The free end of the said tube may be connected directly with the atmosphere. On the other hand, means may be provided to supply compressed air to the central bore of the adjusting rod in dependence upon a regulating value, such as the speed of the runner, the pressure obtaining at the runner outlet, or the opening of the guide assembly of the turbine.

Examples of constructional forms of a hydro-electric power plant constructed in accordance with the invention, with reference to which the operation will be described, are illustrated in the accompanying drawings, in which:

Figure 1 is a vertical longitudinal section through the turbine part of a hydro-electric power plant, Figure 2 is an axial longitudinal section through the parts on the generator side of the same hydro-electric power plant which serve for the supply of air, Figures 3 and 4 show modifications of the construction of the air supply arrangements on the side of the free end of the generator shaft, and Figure 5 shows a particular construction of an arrangement for the supply of oil serving to fill the runner hub.

The turbine illustrated in Figure 1 comprises a runner consisting of adjustable runner vanes 1 extending laterally from a central hollow hub 2 with a cowling 3, the said hub tapering downstream toward its terminal end and at its upstream end being secured to a hollow turbine shaft 4. An inner cover structure 5 and an outer cover structure 6 form the upper boundary of the flow space. The water flows successively through a supporting vane structure 7 and a guide assembly consisting of adjustable vanes 8, whereafter it is fed as a coaxially whirling body against the upstream faces of the runner vanes to cause rotation of the runner and discharges in the downward direction. The guide vanes are operated by rotation of a regulating ring 9.

The runner vanes are regulated by an adjusting rod 10 extending coaxially through the hollow shaft 4, the said rod projecting into the hub 2 and supporting at its lower end an adjusting spider 11 and being operatively connected to the pivot of the runner vanes 1 through the said spider and through straps and levers so as to turn these vanes about their axes by its axial shifting. Arranged at the upper end of the adjusting rod 10 is a servomotor 12 which is enclosed by a housing 13 secured to the upper end of the shaft 4.

The adjusting rod 10 has a central bore 14 which communicates with the discharge side of the runner through a bore 15 in an extension piece 16 attached to the lower end of the adjusting rod 10. The extension piece 16 extends through the downstream terminal end of the runner hub 3 and moves with the adjusting rod when the latter is shifted. The interior of the runner hub is sealed off from the water chamber by a stuffing box 17.

The bore 14 serves to admit air to the outlet side of the runner. As will be seen from Figure 2, there is connected for this purpose to the upper end of the adjusting rod 10 a tube 18 communicating with the bore 14 of the said adjusting rod.

The generator comprises a hollow shaft 19 arranged coaxially to the turbine shaft and connected to the servomotor housing 13. The tube 18 extends throughout the length of the said generator shaft.

The tube 18 communicates with the atmosphere through a spring-loaded shut-off valve 20 and an aperture 21 of an air supply housing 22. The shut-off valve 20 permits air to enter the tube 18 and thus to enter the central bore 14 of the adjusting rod 10 only when the pressure at the outlet side of the runner, or at the outlet mouth of the bore 15, has dropped to such a value that the pressure difference with respect to the atmosphere is capable of overcoming the spring loading of the shut-off valve 20 and of opening this valve.

By appropriate adjustment of the closing spring of the shut-off valve the admission of air to the outlet side of the runner can be permitted only at pressures so low that they might give rise to the disturbance in operations which have been described at the beginning. The supply of air through the central bore obviates above all the disturbances which might result from the formation of an eddy core in the flow on the outlet side of the runner under extreme operating conditions.

In addition, the installation illustrated in Figures 1 and 2 comprises additional means serving for the admission of air to other points at which low pressures may be set up, and more especially to the inlet side of the runner. Divided within the inner cover structure 5 are passages 23 which lead at one end into an annular chamber 24 communicating through bores 25 with the flow chamber on the inlet side of the runner near the upstream end of the hub. The annular chamber 24 furthermore communicates through bores 26 with an annular space 27 in the runner hub 2, from which annular space passages 28, 29 lead at various points of the runner hub into the flow chamber.

The upper end of the passages 23 is adjoined on one side by a tube 30 which establishes connection with the atmosphere. This arrangement thus permits admission of air both to the inlet side of the runner and to further points in the region of the runner hub from the atmosphere when a pressure below atmospheric pressure is set up.

Adjoining the other of the two passages 23 illustrated is a tube 31 which may be connected, for example, to compressed-air storage devices not shown. Float valves 32 prevent liquid from leaving the flow chamber through the tubes 30 and 31.

A throttle member 33 operated by means of a slideway 34 secured to the regulating ring 9 is provided in the tube 31. The throttle member 33 and the regulating ring 9 are so operatively connected together that the throttle member opens preferably with a wide opening of the guide assembly, that is to say, with a large throughflow of water, and thus initiates the admission of air to the runner.

In addition, in the installation illustrated in Figures 1 and 2, arrangements are provided to permit filling of the runner hub with oil. The turbine shaft 4 and the adjusting rod 10 are so designed as to define a free annular passage 35 between them. The said annular passage communicates with the interior of the runner hub through bores 36 and serves to supply oil into the interior of the hub.

In addition, 37 and 38 are tubes which surround the air admission tube 18 and extend in the same manner as this tube within the hollow generator shaft 19. The tubes 18, 37 and 38 have between them free annular passages which serve for the supply of pressure medium to both sides of the servomotor piston 12.

The outer tube 37 defines together with the hollow generator shaft 19 an annular passage 39 extending in the latter. The said annular passage communicates at its lower end through a connecting tube 40 with the annular passage 35 in the turbine shaft, and leads into a rotating oil vessel 41 at the upper end of the generator shaft. The oil serving to fill the runner hub can flow from the said vessel through the annular passage 39, the connecting tube 40, the annular passage 35. When this oil system is completely full, a free liquid surface having the form of a paraboloid or revolution is formed within the vessel 41 under the influence of the rotation.

Due to this arrangement, it is possible to place the interior of the runner hub under the pressure of an oil column extending to the upper end of the generator shaft.

Figure 3 shows a further constructional form of the air supply arrangement on the side of the free end of the generator shaft. Means are shown therein which permit the admission of air into the central bore of the adjusting rod only under the action of an increase in the speed of the runner. These means consist of a shut-off valve 42 arranged at the free end of the air admission tube 18 extending through the generator shaft, which shut-off valve is controlled by a centrifugal governor 42 comprising centrifugal weights 43 and a spring 44.

The said spring is so dimensioned that at the normal speed of the runner the spring force is capable of maintaining the centrifugal forces in equilibrium when the shut-off valve 42 is in the closed position. However, as soon as the speed of the runner exceeds a certain value, the centrifugal forces overcome the spring force and the governor causes the shut-off valve 42 to open. It is thus possible by means of such an air admission arrangement to prevent the formation of an unstable flow on the outlet side of the runner, such as may otherwise occur at increased speed owing to the formation of an eddy core.

In the constructional form illustrated in Figure 4, the free end of the air admission tube 18 extending through the generator shaft is surrounded by an air supply housing 45. 46 is a float valve which in turn has the object of preventing a return flow of liquid, in the same manner as the float valves 32.

The interior of the housing 45 is connected with the atmosphere through a pipe 47 having a throttle member 48 disposed therein. 9 is again the guide wheel regulating ring, to which a slideway 49 is secured, from which the throttle member 48 is actuated by rotation of the regulating ring 9. This arrangement consequently permits the admission of air through the tubes 47 and 18 into the central bore 14 in the adjusting rod in dependence upon the position of the guide vanes of the turbine. The operative connection between the regulating ring and the throttle member is preferably such that the throttling member is opened with a wide opening of the guide vanes, that is to say, with a large throughflow of water.

It is also possible to combine the arrangement according to Figure 3 with that according to Figure 4 by constructing the valve 42 controlled by the speed increase above the float valve 46 in the housing 45. Such an arrangement then permits admission of air into the central bore of the adjusting rod only with a wide opening of the guide assembly and with a simultaneous speed increase.

Instead of supplying air from the atmosphere to the central air supply arrangement as illustrated in Figures 2, 3 and 4, it is possible to employ compressed air, for example, from a storage vessel or a battery of storage vessels. This compressed air can then be supplied to the central bore of the adjusting rod in dependence upon a regulating value, such as the speed of the runner or the position of the guide wheel regulating ring, respectively the guide wheel opening.

Finally, Figure 5 shows a modification of the construction of the means for the supply of oil to the runner hub in the region of the upper end of the generator shaft. This construction is particularly appropriate at high speeds, at which the free surface of the oil in the vessel 41 of Figure 2 would be too much inclined. According to Figure 5, a ring 50 is secured to the upper end of the generator shaft 19. A further ring 51 is rigidly connected to the tube 37, which together with the generator shaft 19 defines the annular passage 39 serving to supply the oil to the interior of the runner hub. The two rings 50 and 51 are in contact at their end faces with packing rings 52 which are secured to a fixed housing 53. The two packing rings 52 are pressed against the rings 50 and 51 by the pressure of springs 54, so that a completely satisfactory packing is possible when the interior of the housing 53 is being filled with oil through a pipe 55 leading into the said housing.

The pipe 55 is connected to an oil reservoir not shown, which may be arranged at any desired level in the power house, in a substantially higher position than the turbine, and in some cases even above the upper water level of the turbine. Thus, by means of such an arrangement the oil serving to fill the runner hub is fed under pressure from a fixed reservoir to the shaft system 4, 19. The interior of the runner hub can consequently be placed under considerable oil pressure, whereby the safety against the penetration of water is increased.

In order to avoid as far as possible a circulation of oil in the annular passages 35 and 39 of the turbine and generator shafts during governing operations, the adjusting rod 10 and the extension piece 16 are preferably constructed with equal external diameters, so that on movement of the runner adjusting mechanism the liquid content of the runner hub is not varied, that is to say, oil is neither displaced nor taken in.

What is claimed is:

1. In a hydro-electric power plant consisting of a propeller type turbine with a vertical axis and a generator driven by said turbine and arranged coaxially above said turbine: a turbine runner comprising adjustable vanes extending laterally from a central hollow hub, said hub tapering downstream from said runner toward its terminal end; means including conduit means and adjustable guide vanes for feeding a coaxially whirling body of water against the upstream faces of said vanes to cause rotation of said runner; a hollow turbine shaft secured to the upstream end of said hub and connected to drive a hollow generator shaft arranged coaxially to said turbine shaft and forming part of the rotor of said generator; an adjusting rod extending coaxially through said hollow turbine shaft and having a central bore, said adjusting rod projecting into said hub and being therein operatively connected to pivot pins of said runner vanes whereby said runner vanes are turned about their axes by an axial shifting of said adjusting rod; servo-means capable of producing an axial shifting of said adjusting rod; and a flow connection extending through said terminal end of the hub and communicating with said central bore of the adjusting rod, thus allowing air introduced into said central bore to discharge through the downstream terminal end of the hub.

2. The combination defined in claim 1 in which a cylindrical extension piece with a central bore is rigidly connected to the lower end of the adjusting rod, said extension piece extending through an aperture of the terminal end of the hub and there being sealed by a stuffing box, and said extension piece and adjusting rod having equal external diameters.

3. The combination defined in claim 1 in which means are provided permitting admission of air into the central bore of the adjusting rod only under action of an increase in speed of the runner.

4. The combination defined in claim 1 in which means are provided which are operatively connected to the guide vanes and allow air to enter the central bore of the adjusting rod in dependence upon the position of the guide vanes.

5. The combination defined in claim 1 comprising additional means for introducing air into the water fed to the runner near the upstream end of the hub.

6. The combination defined in claim 1 with a tube connected to the upper end and communicating with the central bore of said adjusting rod, extending coaxially through said hollow generator shaft and having a free end projecting out of said generator shaft, said tube allowing air introduced from outside into said free end to flow into said central bore of the adjusting rod.

7. The combination defined in claim 6 in which the free end of said tube communicates with the atmosphere.

8. The combination defined in claim 6 presenting a shut-off valve arranged at the free end of said tube extending through the generator shaft; and a centrifugal governor connected to rotate with the runner and operatively connected to said shut-off valve so as to open said valve when the speed of the runner exceeds a certain value.

9. The combination defined in claim 6 in which a spring loaded shut-off valve is connected to the free end of said tube extending through the generator shaft, said shut-off valve, by the action of said spring, being allowed to open only when a certain pressure below atmospheric is attained within said tube.

10. The combination defined in claim 6 in which the outer surface of the adjusting rod and the inner surface of the hollow turbine shaft define an annular passage, said annular passage communicating with the interior of the hub and with an annular passage extending through the generator shaft so as to serve for the supply of oil intended to fill the runner hub.

11. The combination defined in claim 10 in which the annular passage extending through the generator shaft communicates with an oil vessel arranged at the upper end of the generator shaft.

12. The combination defined in claim 10 in which packing means are provided at the upper end of the generator shaft, said packing means allowing to feed oil under pressure into said annular passage extending through the generator shaft.

References Cited in the file of this patent

UNITED STATES PATENTS

| | | |
|---|---|---|
| 2,227,417 | Ring et al. | Dec. 31, 1940 |
| 2,281,214 | Van Erp | Apr. 28, 1942 |
| 2,494,623 | Landt | Jan. 17, 1950 |

FOREIGN PATENTS

| | | |
|---|---|---|
| 81,700 | Sweden | Oct. 9, 1934 |